Dec. 27, 1955   R. E. EDWARDS   2,728,617
BEARING SUPPORT FOR SWINGS AND GLIDERS
Filed Sept. 6, 1952
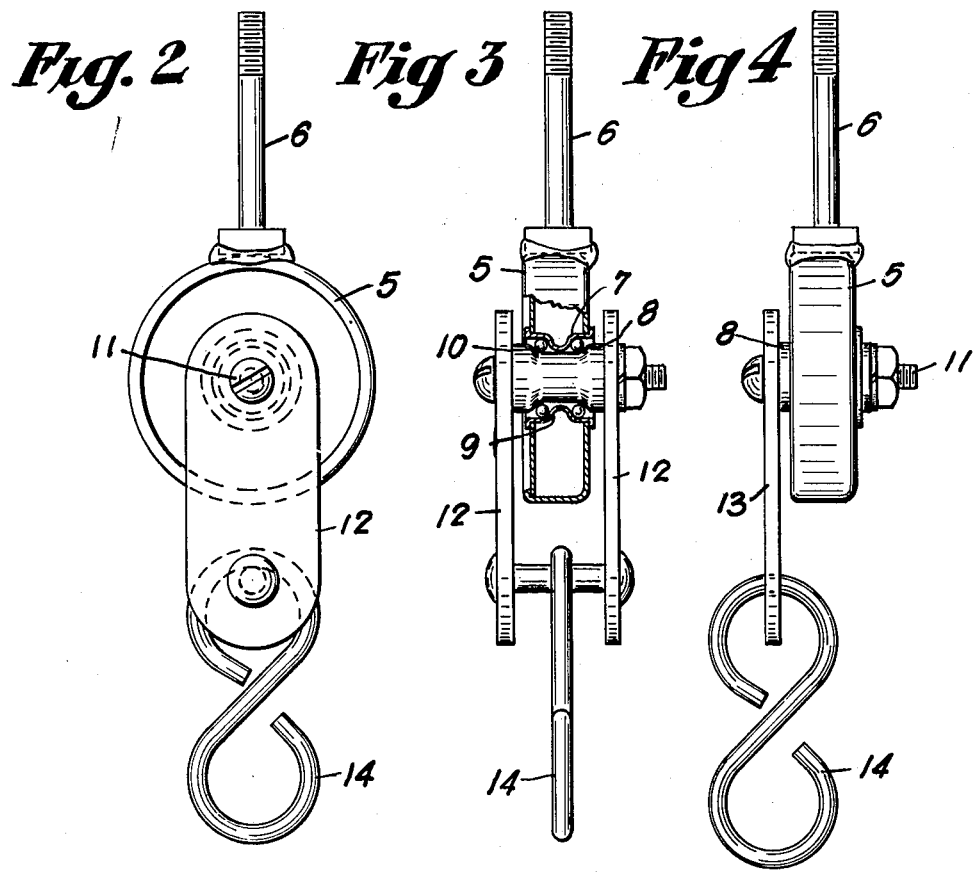
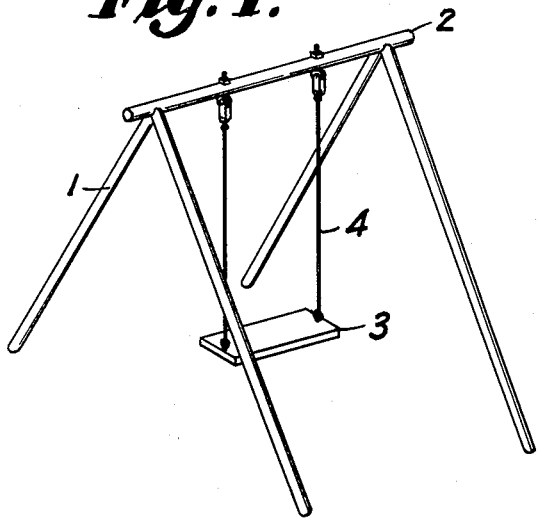
Inventor
Robert E. Edwards
By
Kenneth M. Thorpe
Attorney

United States Patent Office 2,728,617
Patented Dec. 27, 1955

2,728,617

BEARING SUPPORT FOR SWINGS AND GLIDERS

Robert E. Edwards, Kansas City, Mo.

Application September 6, 1952, Serial No. 308,213

1 Claim. (Cl. 308—189)

This invention relates to roller or ball bearings for porch and lawn swings and the like and has for its chief object to produce a bearing of such nature that there will be no binding or jambing in service leading to oscillation of any part of the swing around a point which could lead to wear and breakage or become noisy.

Another object of the invention is to produce a swing support in which the bearing is more or less protected from the weather and outside of periodical oiling will need no attention to keep it from rusting or corroding.

A further object of the invention is to produce a bearing support of strong, durable and inexpensive construction.

With the general objects named in view and others as may hereinafter appear, the invention consists in certain new and useful features of construction and organization of parts as hereinafter described and claimed; and in order that it may be fully understood, reference is to be had to the accompanying drawings, in which:

Figure 1 is a perspective view of a lawn swing supported by a bearing involving the invention.

Figure 2 is a side elevation of a double bridle support bearing.

Figure 3 is an edge view of the construction shown in Figure 2, partially broken away.

Figure 4 is an edge view of a single bridle construction, the internal mechanism being the same as that shown in Figure 3.

In the said drawing, where like reference characters identify corresponding parts in all of the figures, 1 is a ground supporting stand which is intended to be representative of any suitable support, such as the limb of a tree or the roof of a porch. The bearing 2 is secured in position as will hereinafter appear, and the seat 3 is suspended by ropes, cables or chains 4.

The bearing comprises an outside casing member 5 to which any suitable suspension means, such as the bolt 6 is welded. Casing member 5 is internally formed with a ball or roller bearing race 7.

Projecting through the casing is a hollow shaft member 8 having an external ball or roller bearing race 9. Secured between the cooperating races 7 and 9 are a series of balls 10.

With the above construction, it is to be noted that regardless of the degree of clamping pressure against the ends of the shaft member 8, no binding stress or strain will be imposed on the ball bearing 10 to interfere with their freedom of operation.

Extending through the hollow shaft 8 is a bolt 11 which is used to tightly clamp the double or single bridle 12 or 13, respectively, tightly against the ends of said shaft so that the bolt cannot oscillate. This arrangement guards against wear on the bolt and noisy operation. The bridle members support any suitable type of S-hook 14 or the like to which the cables, chain or ropes 4 are attached.

From the above description and drawing it will be apparent that I have produced a construction embodying all of the features of advantage set forth as desirable, and which I have described and illustrated the preferred construction, it is to be understood that I reserve the right to all changes within the spirit and scope of the appended claim.

I claim:

In a swing support, a cylindrical casing member having a pair of opposed internal ball-bearing races, a suspension member rigid with said casing, a tubular shaft extending through the casing and having a pair of opposed external ball-bearing races respectively in opposition to a casing race, ball-bearings in said races, a headed bolt loosely extending through the hollow shaft and having a threaded end, a clamp nut on the end of said bolt, and a suspension bridle having through holes receiving the bolt and clamped by the bolt against an end of the shaft to avoid relative movement between the bridle, bolt and shaft.

References Cited in the file of this patent

UNITED STATES PATENTS

| | | |
|---|---|---|
| 1,207,985 | Null et al. | Dec. 12, 1916 |
| 1,359,506 | Hoerle | Nov. 23, 1920 |
| 1,756,413 | Wilke et al. | Apr. 29, 1930 |
| 1,790,423 | Hooks | Jan. 27, 1931 |
| 1,941,366 | Searles et al. | Dec. 26, 1933 |
| 2,042,882 | Delaval-Crow | June 2, 1936 |

FOREIGN PATENTS

| | | |
|---|---|---|
| 555,751 | France | July 6, 1923 |